ས། ྻ

United States Patent
Fan

(10) Patent No.: US 10,020,476 B2
(45) Date of Patent: Jul. 10, 2018

(54) ARTICULATE BATTERY CASE

(71) Applicant: American Lithium Energy Corporation, Vista, CA (US)

(72) Inventor: Jiang Fan, San Diego, CA (US)

(73) Assignee: American Lithium Energy Corporation, Carlsbad, CA (US)

( * ) Notice: Subject to any disclaimer, the term of this patent is extended or adjusted under 35 U.S.C. 154(b) by 301 days.

(21) Appl. No.: 14/673,608

(22) Filed: Mar. 30, 2015

(65) Prior Publication Data

US 2015/0280186 A1 Oct. 1, 2015

Related U.S. Application Data

(60) Provisional application No. 61/971,889, filed on Mar. 28, 2014, provisional application No. 62/031,684, filed on Jul. 31, 2014.

(51) Int. Cl.
*H01M 2/10* (2006.01)
*H01M 2/20* (2006.01)

(52) U.S. Cl.
CPC ....... *H01M 2/1077* (2013.01); *H01M 2/1005* (2013.01); *H01M 2/206* (2013.01); *Y10T 29/4911* (2015.01)

(58) Field of Classification Search
CPC ........................... H01M 2/0177; H01M 2/206
See application file for complete search history.

(56) References Cited

U.S. PATENT DOCUMENTS

| 5,572,401 A | 11/1996 | Carroll |
| 6,097,607 A | 8/2000 | Carroll et al. |
| 6,341,460 B1 * | 1/2002 | Lalvani ............... B44C 3/12 |
| | | 52/311.2 |

(Continued)

FOREIGN PATENT DOCUMENTS

WO    WO-01/44954 A2    6/2001

OTHER PUBLICATIONS http://www.guden.com/Control/glossary Feb. 3, 2012.*

(Continued)

*Primary Examiner* — Stewart A Fraser
*Assistant Examiner* — Rachel L Zhang
(74) *Attorney, Agent, or Firm* — Mintz Levin Cohn Ferris Glovsky and Popeo, P.C.

(57) ABSTRACT

An articulate battery case encases a battery ensemble having multiple non-contiguous battery segments flexibly interconnected to one another by conductive leads. The articulate battery case employs a plurality of rigid compartments for encasing the battery ensemble. Each compartment is configured for encasing one non-contiguous battery segment. Each compartment is flexibly connected by one or more flexible hinge to at least one adjoining compartment and is articulate therewith. Each compartment defines one or more ports for interconnecting conductive leads between battery segments encased in adjoining compartments. Each compartment is interconnected to every other compartment, with or without one or more intervening compartment. When a battery ensemble is encased within the articulate battery case, it is rendered articulate, i.e., it acquires the articulation characteristics of the case within which it is contained.

16 Claims, 15 Drawing Sheets

(56) References Cited

U.S. PATENT DOCUMENTS

| | | | |
|---|---|---|---|
| 2006/0102023 A1* | 5/2006 | Rivera | B05C 17/06 |
| | | | 101/127 |
| 2007/0190405 A1* | 8/2007 | Kang | H01M 2/105 |
| | | | 429/99 |
| 2007/0196733 A1* | 8/2007 | Lee | H01M 10/0525 |
| | | | 429/185 |
| 2010/0091237 A1* | 4/2010 | Medana | G02C 5/2236 |
| | | | 351/153 |
| 2012/0002159 A1* | 1/2012 | Blum | G02C 7/081 |
| | | | 351/113 |
| 2013/0171490 A1* | 7/2013 | Rothkopf | H01M 2/0207 |
| | | | 429/120 |

OTHER PUBLICATIONS

Lafontaine, D. "Conformal battery unburdens Army's networked soldiers" *Official Home Page of the United States Army*. U.S. Army, Jul. 16, 2013. Web. Jan. 14, 2016.

* cited by examiner

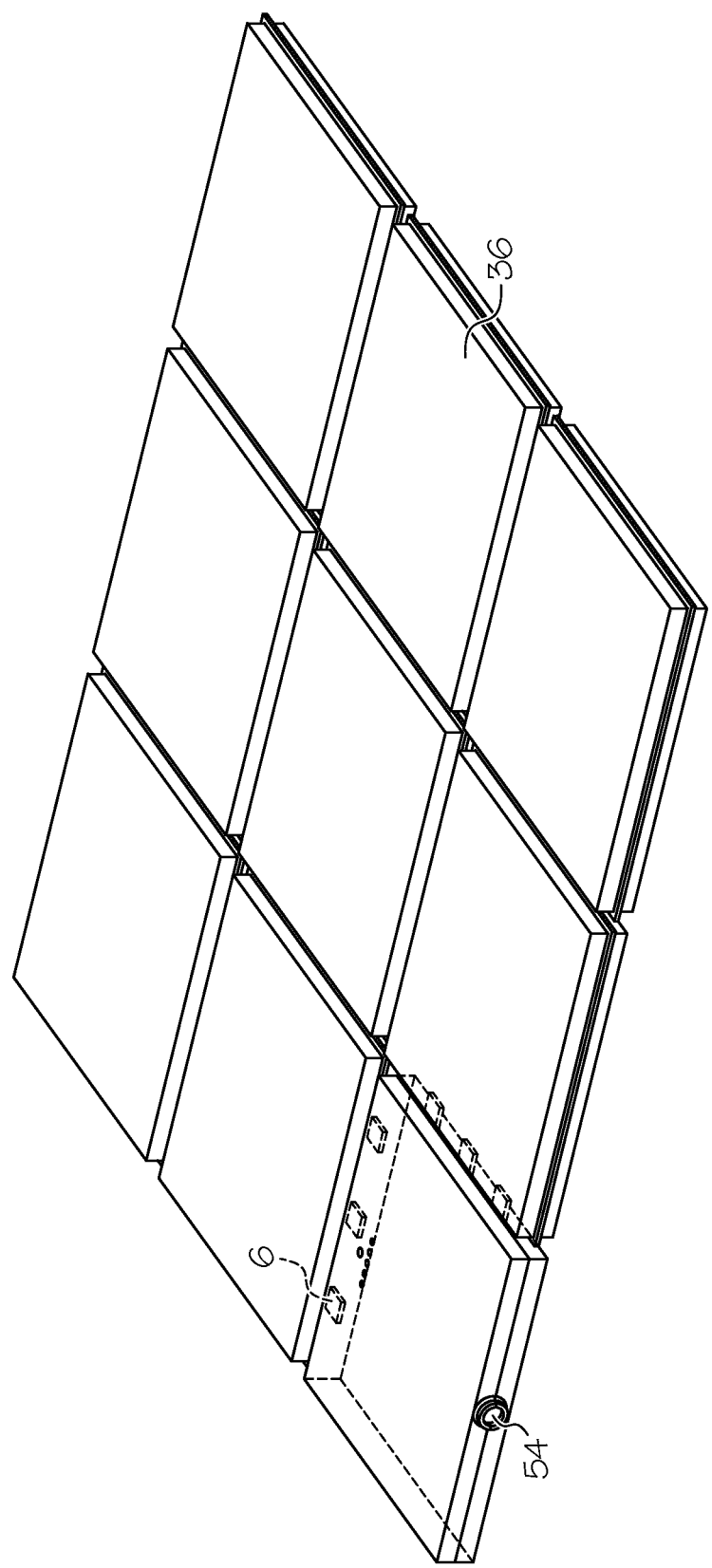

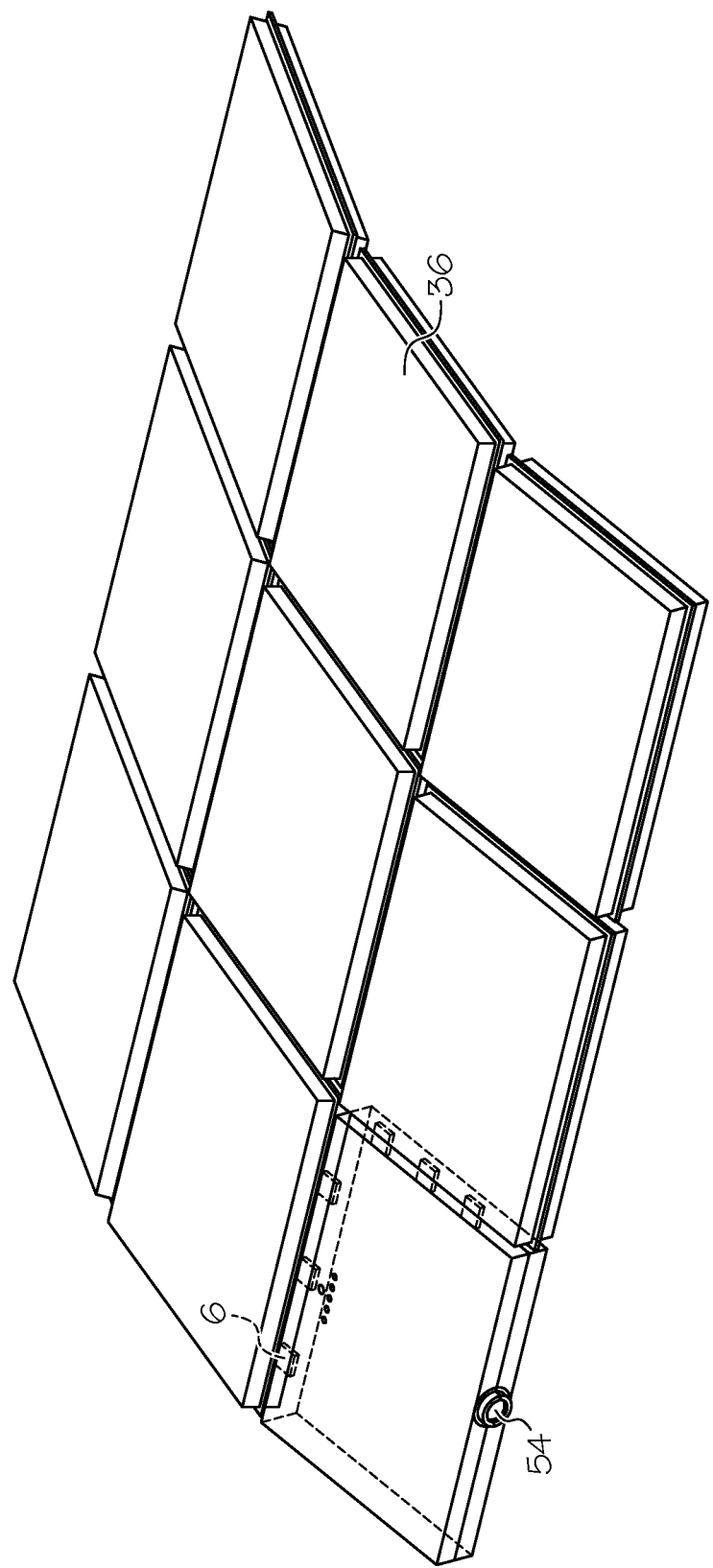

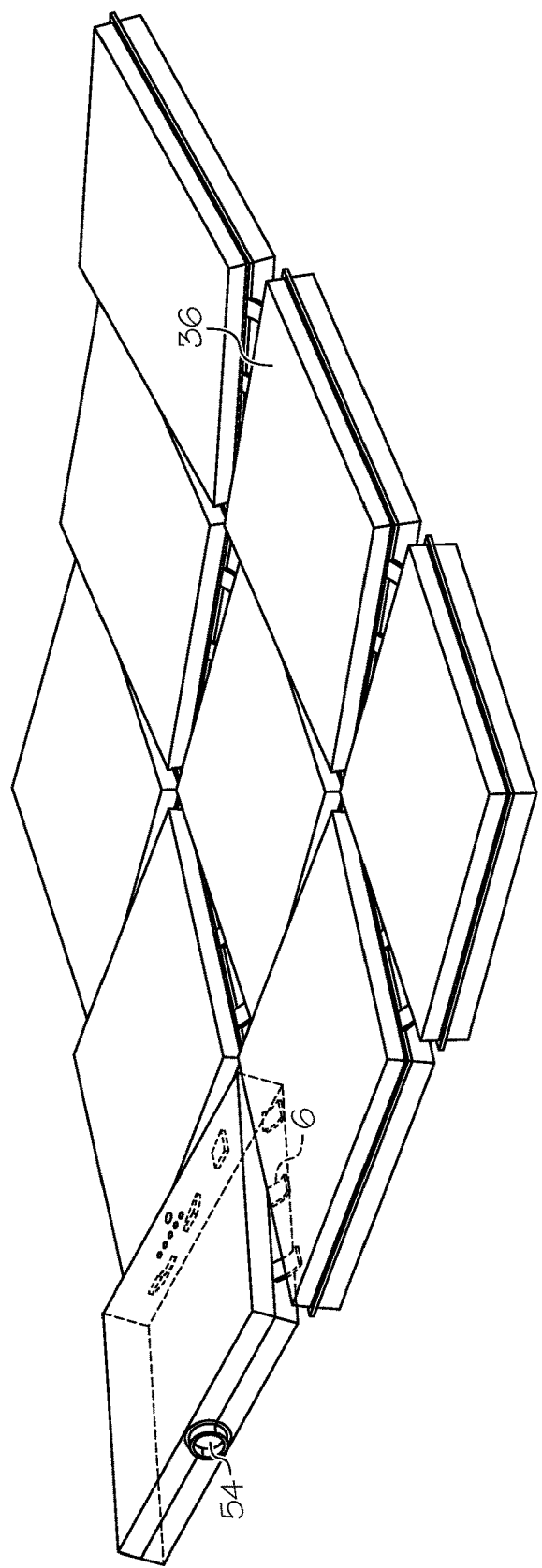

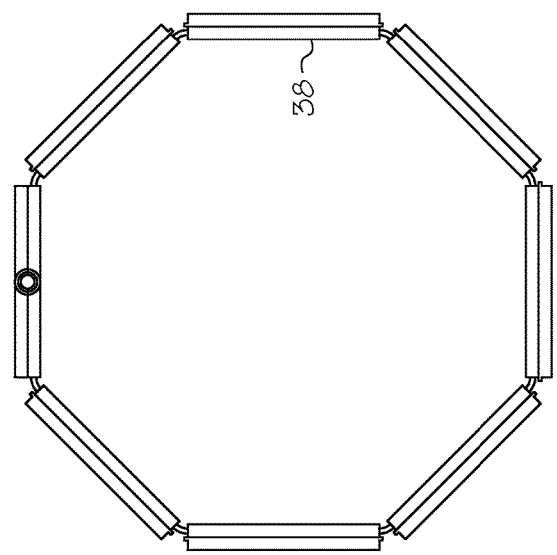
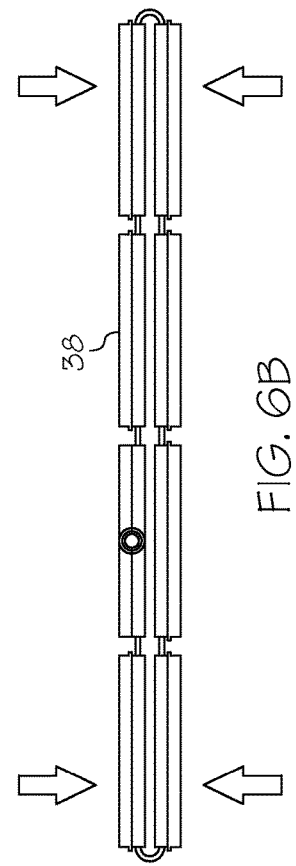
FIG. 6A
FIG. 6B

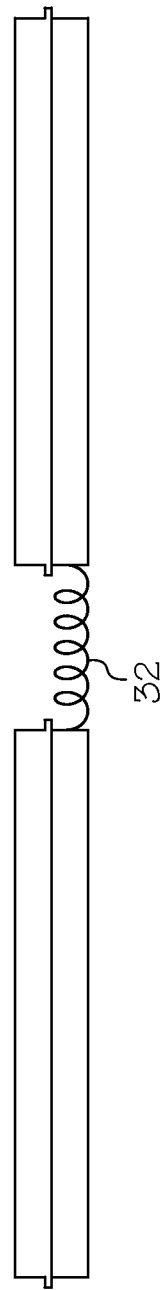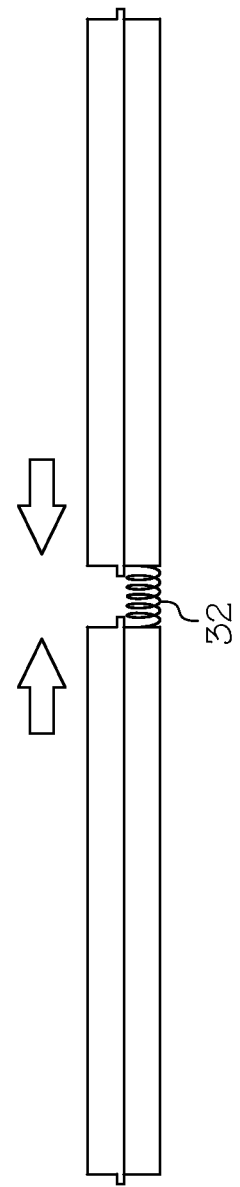

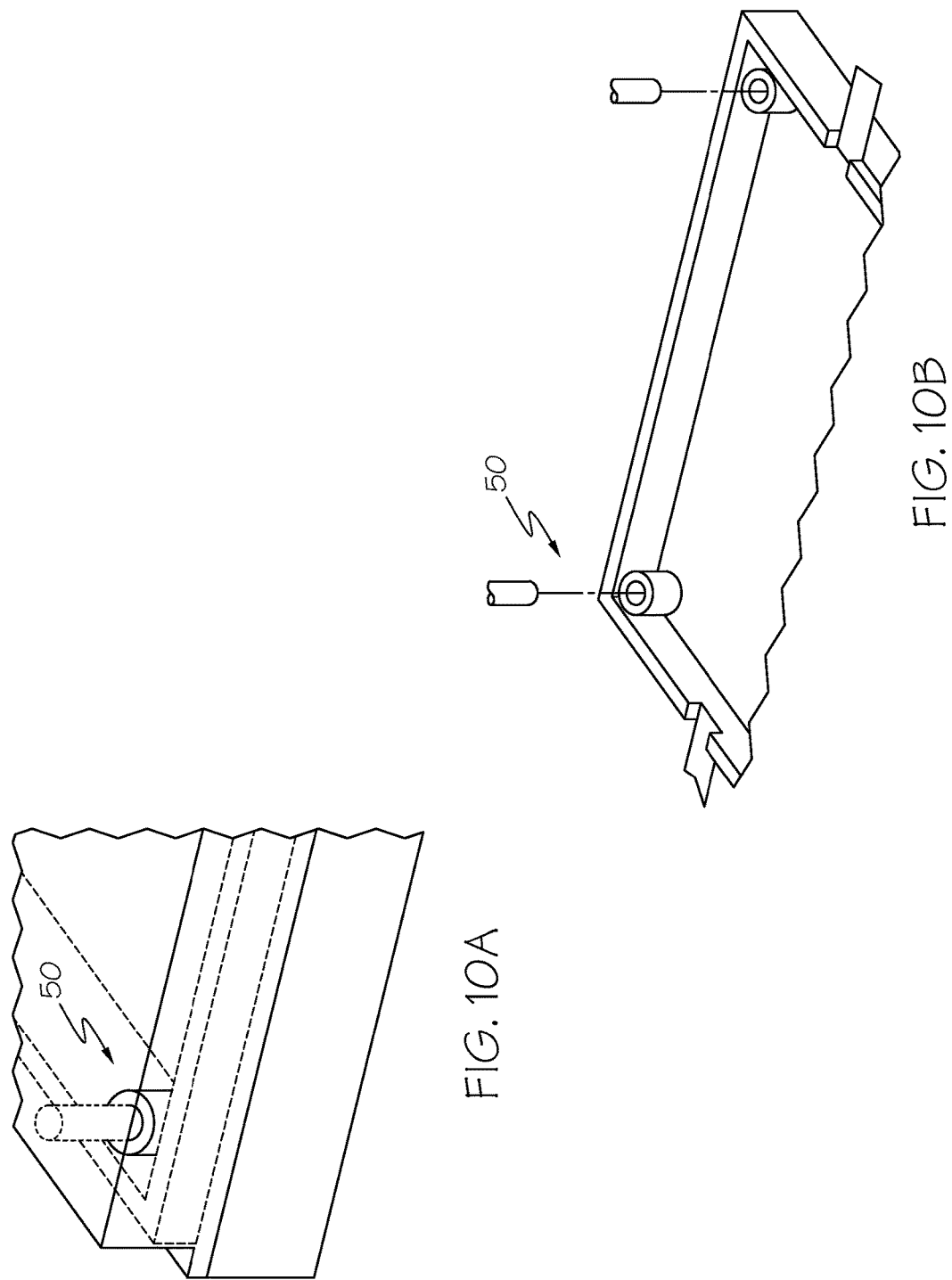

ARTICULATE BATTERY CASE

This invention was made with government support under Contract No. W911QY-11-C-0059 awarded by the Natick Contracting Division, U.S. Army Contracting Command-APG. The government has certain rights in the invention.

FIELD OF INVENTION

The invention relates to battery cases. More particularly, the invention relates to articulate battery cases.

BACKGROUND

A battery case is a protective covering for storing or housing a battery. The battery case is conventionally constructed in two parts, viz., a base and a lid. The base portion supports the battery; the lid portion provides access to the battery for servicing or replacement. If the battery is connected to a power lead, the battery case may include an egress port through which the power lead can exit. Battery cases may be employed on automobiles, boats, etc. for shielding the battery from environmental factors.

If a flexible battery is housed in a battery case, the flexibility of the entire ensemble can be maintained by employing a pliable battery case. David Carroll discloses a flexible garment for housing a flexible battery (U.S. Pat. Nos. 5,572,401 and 6,097,607 and WO 0144954). The garment disclosed by Carroll is made of pliable fabric and includes an array of "pockets" for housing the flexible battery.

The US Army has developed a "Conformal Wearable Battery" (CWB). The CWB is a flexible protective case for housing multiple non-flexible batteries inserted within the pocket of a combatant's garment. ("Conformal battery unburdens Army's networked Soldiers" Dan Lafontaine, U.S. Army Research, Development and Engineering Command, Jul. 16, 2013, see: www.army.mil.) The CWB houses multiple battery modules within a single case and is flexible, so as to conform to the shape and movement of the combatant, but is not articulate.

What is needed is an articulate battery case having conformal flexibility. What is needed is a battery case having multiple compartments flexibly joined to one another, with each compartment separately housing a noncontiguous non-flexile battery module, and with the noncontiguous battery modules being electrically interconnected for forming one single battery.

SUMMARY OF INVENTION

The invention is directed to an articulate battery case for encasing a battery ensemble and to a process for rendering a battery ensemble articulate by encasement in such articulate battery case. Battery ensembles employable with the invention are of a type having multiple non-contiguous battery segments, wherein each battery segment is flexibly interconnected to at least one other battery segment by at least one conductive lead.

One aspect of the invention is directed to an articulate battery case having a plurality of rigid compartments for encasing a battery ensemble, and a plurality of flexible hinges attached to such compartments for flexibly connecting adjoining compartments to one another. Each compartment is configured for encasing one non-contiguous battery segment. Each compartment is flexibly connected to at least one adjoining compartment and is articulate therewith. Each compartment is interconnected to every other compartment, with or without one or more intervening compartment. Each compartment defines one or more ports for interconnecting conductive leads between battery segments encased in adjoining compartments. When a battery ensemble is encased within the articulate battery case, it is rendered articulate, i.e., it acquires the articulation characteristics of the case within which it is contained. Several types of hinges may be employed with the invention. Preferred hinges are resilient, e.g., living hinges. Alternative embodiments of this aspect of the invention may employ linear hinges, coiled spring hinges, wavy hinges, zagged hinges, and diagonally attached hinges. Alternatively, the hinge may have an elastic composite composition. In a further alternative embodiment, the hinge may be compressible. The articulate battery case may also include a stop attached to the compartment for limiting its articulation. In a preferred embodiment, the ports of adjoining compartments are aligned with one another for interconnecting conductive leads between battery segments encased in such adjoining compartments. The compartments may be linked to one another to form a linear array; a matrix array; or a circular array. The compartments may have two halves joined by reversible fasteners. Alternatively, the two halves of the compartments may be joined by irreversible fasteners.

Another aspect of the invention is directed to a method for encasing a battery ensemble. The method comprises the step of encasing the battery ensemble in an articulate battery case.

A further aspect of the invention is directed to a method for articulating a battery ensemble. In the first step of this method, the battery ensemble is encased in an articulate battery case having flexible hinges. And then, in the second step of this method, the encased battery ensemble is articulated within its articulate battery case.

A further aspect of the invention is directed to a method for compressing a battery ensemble. In the first step of this method, the battery ensemble is encased in an articulate battery case having compressible hinges. And then, in the second step of this method, the encased battery ensemble is compressed within its articulate battery case.

A further aspect of the invention is directed to a method for transporting a battery ensemble. In the first step of this method, the battery ensemble is encased in an articulate battery case. Then, in the second step of this method, the encased battery ensemble is inserted into a carrying holder. Then, in the third step of this method, the encased battery ensemble is articulated within its carrying holder for conforming the encased battery ensemble to the carrying holder. And then, in the fourth step of this method, the carrying holder is transported with the encased battery ensemble inserted therein.

BRIEF DESCRIPTION OF DRAWINGS

FIG. 4 is a perspective view illustrating an exemplary matrix type articulate battery case having nine compartments. Interior features of a corner compartment for housing a battery controller are indicated with phantom lines.

FIG. 4A is a perspective view of the matrix type articulate battery case of FIG. 4, illustrating a downwardly flexed configuration about an axis along the central row of the matrix.

FIG. 4B is a perspective view of the matrix type articulate battery case of FIG. 4, illustrating an upwardly flexed configuration about a diagonal axis across the matrix.

FIG. 6A is an elevation view illustrating an exemplary articulate battery case having circularly linked compartments. The articulate battery case illustrated in FIG. 6A is octagonal, having eight compartments linked to one another, and is shown in an uncollapsed configuration.

FIG. 6B is an elevation view illustrating the circularly linked articulate battery case of FIG. 6A in its collapsed configuration, after the application of a collapsing force.

FIG. 7A is an elevation view illustrating an exemplary articulate battery case having two compartments linked to one another with a compressible hinge. The articulate battery case is shown in its uncompressed configuration.

FIG. 7B is an elevation view illustrating the two compartment articulate battery case of FIG. 7A in its compressed configuration, after the application of a compressing force.

FIG. 10A is an enlarged perspective unexploded view of a fragment of the articulate battery case of FIG. 10, illustrating details of the interference fit engagement of the captive fasteners with one another (phantom lines), for irreversibly fastening the upper and lower halves of the articulate battery case to one another. Only a corner section of one of the side compartments is illustrated.

FIG. 10B is an enlarged perspective view of a fragment of the lower half of the central compartment of the articulate battery case of FIG. 10, illustrating details of the captive fasteners.

DETAILED DESCRIPTION

Figure 1:
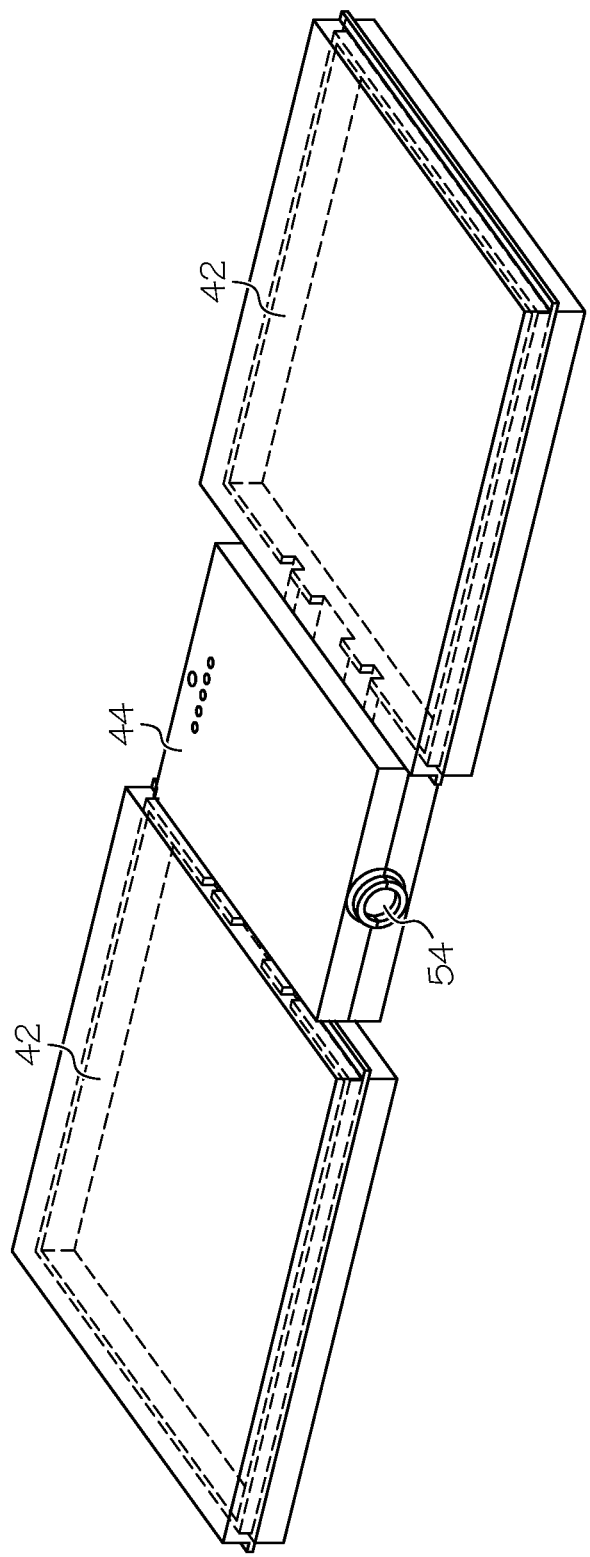
FIG. 1 is a perspective view illustrating an exemplary linear type articulate battery case having a central compartment and two side compartments. Interior features of the two side compartments are indicated with phantom lines.
Figure 2:
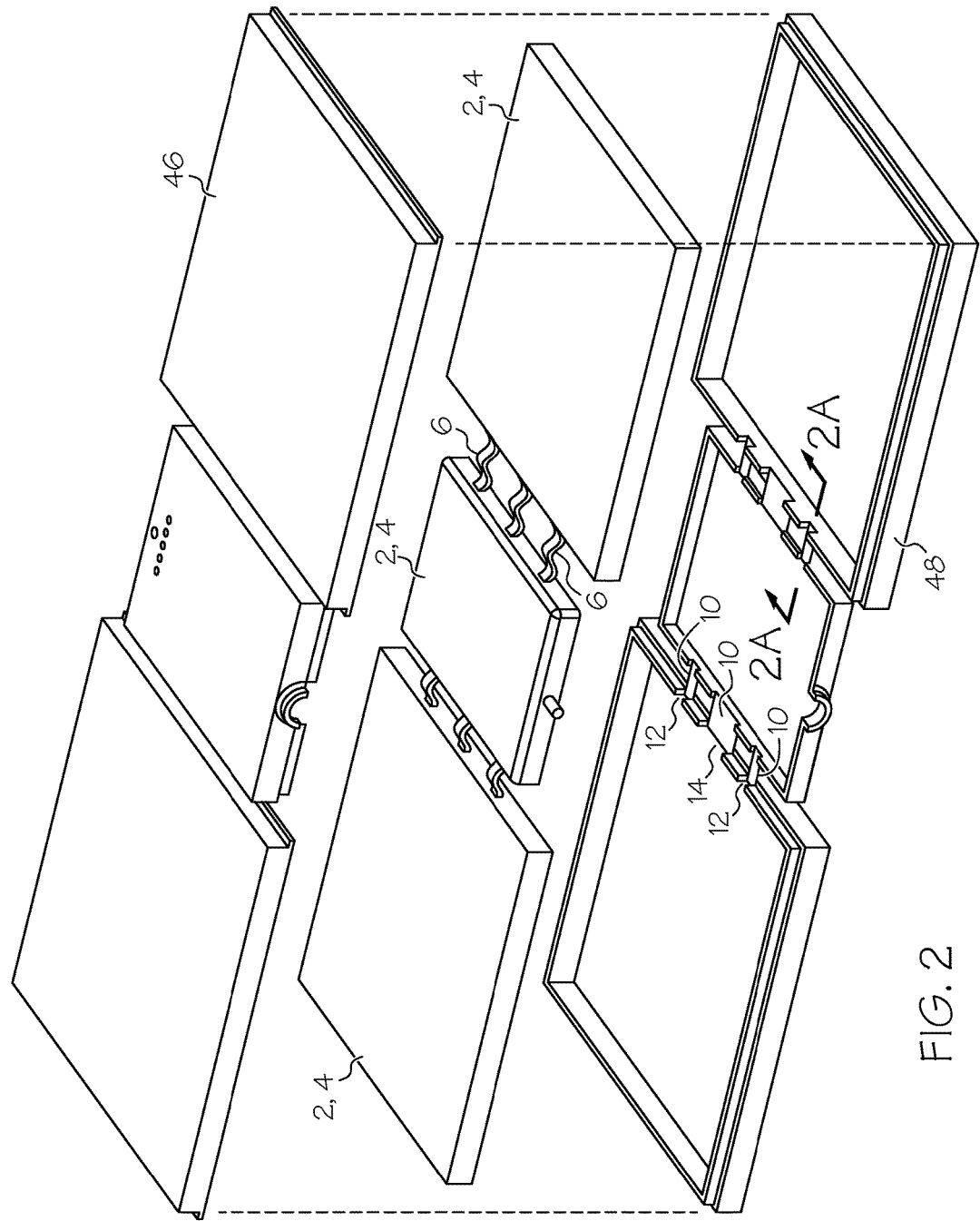
FIG. 2 is an exploded view of the articulate battery case of FIG. 1, illustrating the interior of the compartments and battery segments contained therein. The three battery segments are connected to one another with flexible leads. The battery segments in the two side compartments are battery cells; the battery segment in the central compartment is a battery controller.
Figure 2A:
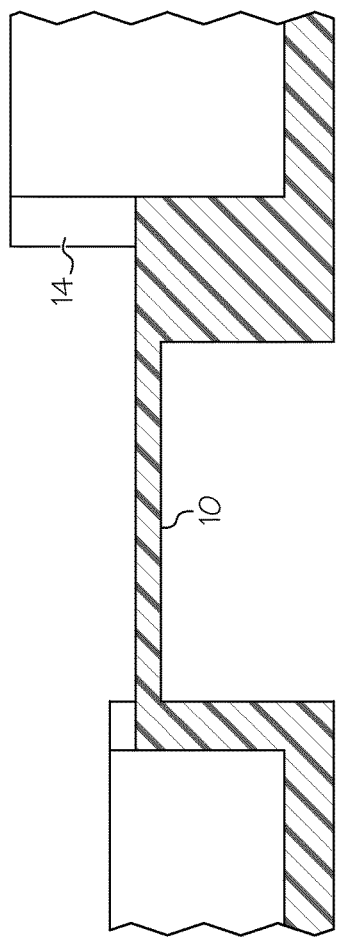
FIG. 2A is an enlarged sectional view of a portion of the exemplary articulate battery case of FIG. 2, illustrating the hinge.

A preferred articulate battery case is illustrated in FIG. 1. The articulate battery case is employed for encasing battery ensembles 2, so as to render such battery ensembles conformable to a user's shape. Battery ensembles 2 employable with the invention are of a type having multiple non-contiguous battery segments 4, wherein each battery segment 4 is flexibly interconnected to at least one other battery segment 4 by at least one conductive lead 6. Battery ensembles 2 encased within articulate battery cases may be inserted into a pocket within clothing worn by the user, so as to facilitate the simultaneous use and transport of such batteries by the user. The articulate battery case comprises a plurality of rigid compartments 8 and a plurality of hinges 10. Each individual compartment 8 is employable for containing one of the batteries or electronics. Each compartment 8 defines at least one power port hole 12 for providing access for power connectivity between the batteries and electronics. Each compartment 8 also defines at least one sensor port hole 14 for providing access for sensor connectivity between the batteries and electronics. The plurality of hinges 10 serve to link the individual compartments 8 to one another and provide flexibility. In a preferred embodiment, each of the individual compartments 8 has at least two halves 16 reversibly connectable to one another and disconnectable from one another for loading and unloading the respective batteries or electronics to or from such individual compartments 8. The compartment 8 includes one or more reversible fasteners 18 for fastening the two halves 16 of the compartments 8 to one another.

The individual compartments 8 are linked to one another by the flexible hinges 10 for providing flexibility. Preferred hinges 10 are resilient and have deformed and undeformed conformations. The deformed conformation occurs in the presence of a deforming force. The undeformed conformation occurs in the absence of a deforming force. Each of the flexible hinges 10 has a stiffness with a magnitude sufficiently small, such that the fasteners 18 do not become unfastened when the deforming force is applied to said spring hinges 10 for conforming the flexible battery pack to the user's shape. Several types of hinges 10 may be employed with the invention. Preferred hinges are resilient, e.g., living hinges 10. Alternative embodiments of this aspect of the invention may employ linear hinges 20, coiled spring hinges 22, wavy hinges 24, zagged hinges 26, and diagonally attached hinges 28. Alternatively, the hinge 10 may have an elastic composite composition 30. In a further alternative embodiment, the hinge may be compressible 32.

Figure 3:
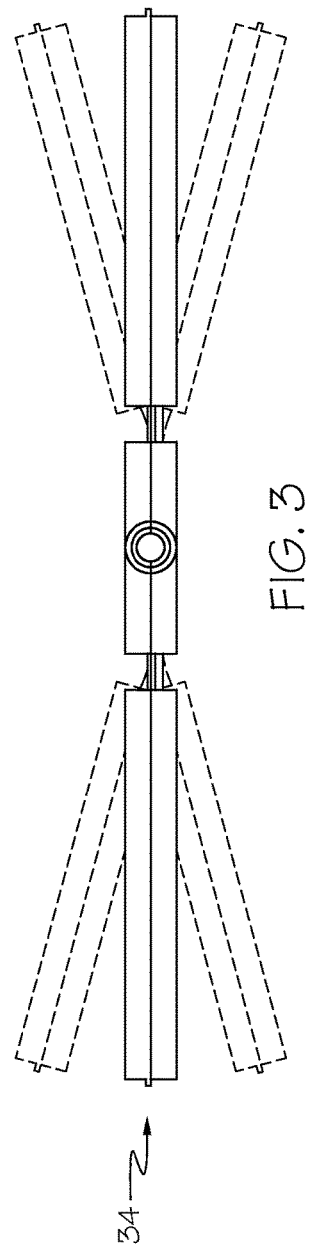
FIG. 3 is an elevation view the articulate battery case of FIG. 1, illustrating the articulate battery case in an unflexed configuration (center) and in upwardly flexed and downwardly flexed configurations (phantom lines).
Figure 3A:
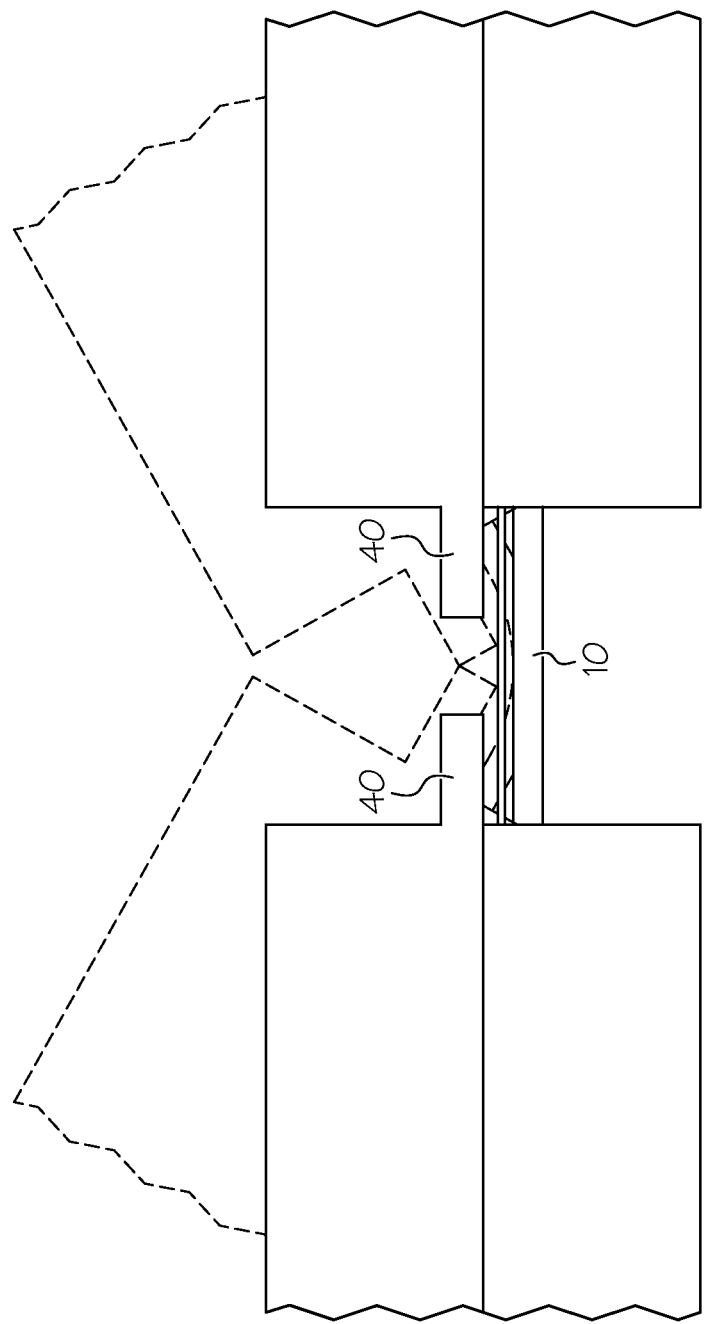
FIG. 3A is an enlarged view of a portion of the articulate battery case of FIG. 3, illustrating the hinge in its unflexed configuration (center), and in its upwardly flexed configuration (phantom lines). A flexible lead is illustrated in the unflexed configuration, but is omitted from the flexed configurations for purposes of simplifying the illustration. In the upwardly flexed configuration, stops are shown in contact with one another.
Figure 5A:
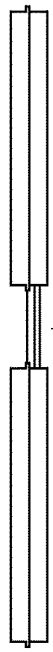
FIGS. 5 A-F are elevation views illustrating articulate battery cases having two compartments linked by a variety of hinges. The hinge illustrated in FIG. 5A is a linear type living hinge; the hinge illustrated in FIG. 5B is a coiled spring type living hinge; the hinge illustrated in FIG. 5C is a wavy type living hinge; the hinge illustrated in FIG. 5D is a zagged type living hinge; the hinge illustrated in FIG. 5E is a linear diagonally attached type living hinge. The hinge illustrated in FIG. 5F has an elastic composite composition.
Figure 5B:
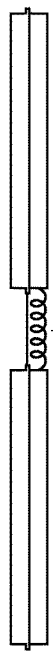
Figure 5C:
Figure 5D:
Figure 5E:
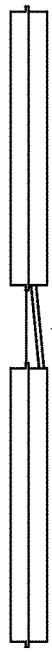
Figure 5F:

In alternative embodiments, the compartments 8 may be linked to one another to form a linear array 34, as illustrated in FIG. 3; a matrix array 36, as illustrated in FIG. 4; or a circular array 38, as illustrated in FIG. 6.

In an alternative embodiment, the above articulate battery case may further include a plurality of stops 40. Each stop 40 is attached to a compartment 8 for limiting the flexibility thereof.

EXAMPLE

An exemplary articulate battery case is illustrated in FIG. 1. The flexible battery pack includes three rigid compartments, viz., two side compartments 42 for containing one battery each and a central compartment 44 for containing associated electronics. Optionally, additional side compartments 42 may be added in a serial fashion for containing additional battery segments 4.

Figure 9:
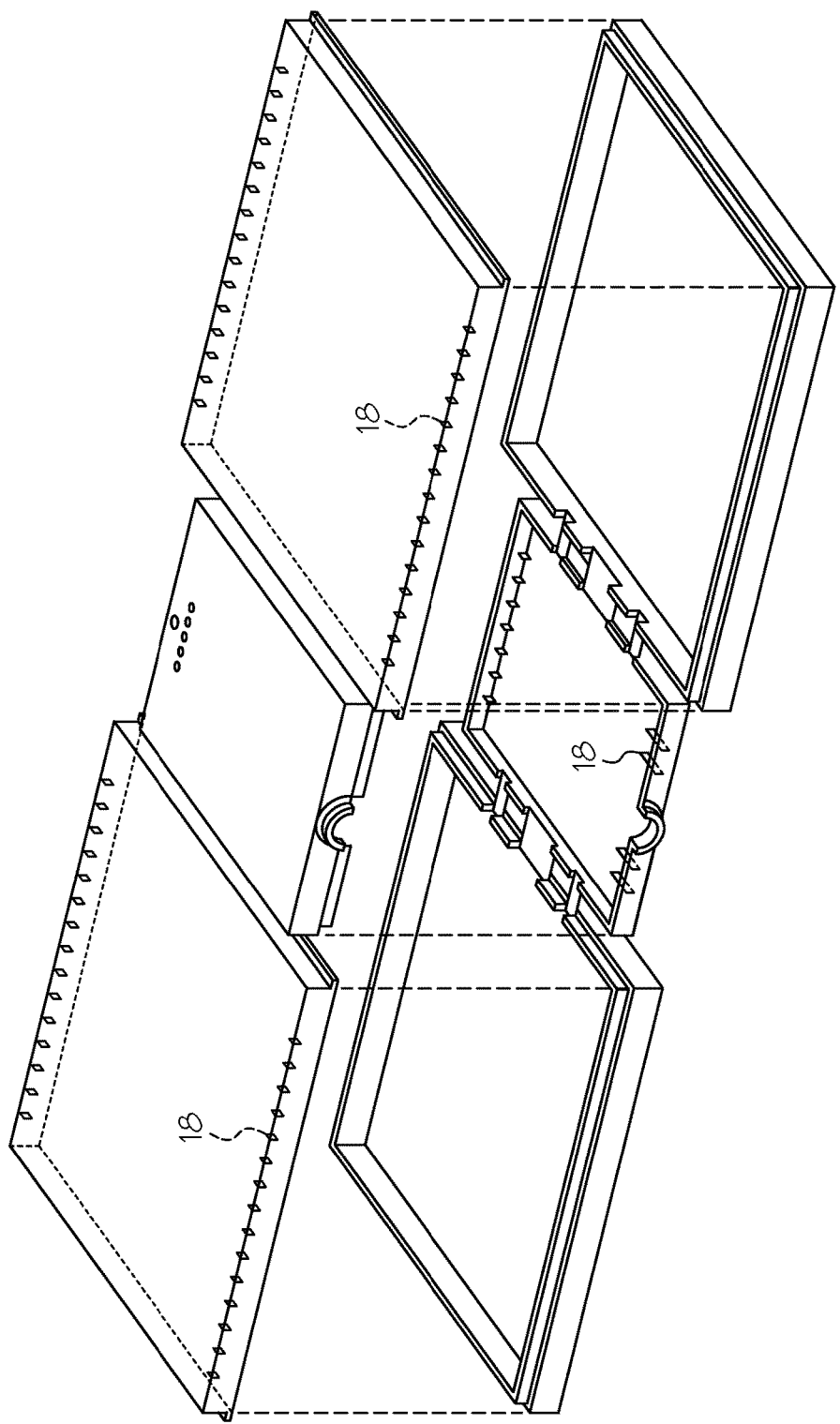
FIG. 9 is an exploded view of an alternative embodiment of the articulate battery case of FIG. 2 (without the battery segments), illustrating the reversible fasteners for reversibly fastening the two halves (upper and lower) of the articulate battery case to one another, for forming the assembled articulate battery case of FIG. 1.
Figure 9A:
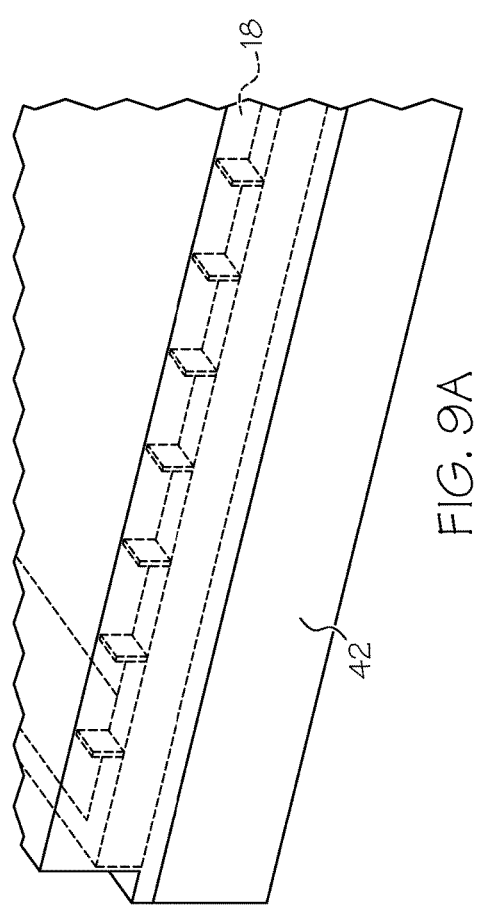
FIG. 9A is an enlarged perspective unexploded view of a fragment of the articulate battery case of FIG. 9, illustrating details of the engagement of the reversible fasteners to one another (phantom lines), for reversibly fastening the upper and lower halves of the articulate battery case to one another. Only a corner section of one of the side compartments is illustrated.
Figure 9B:
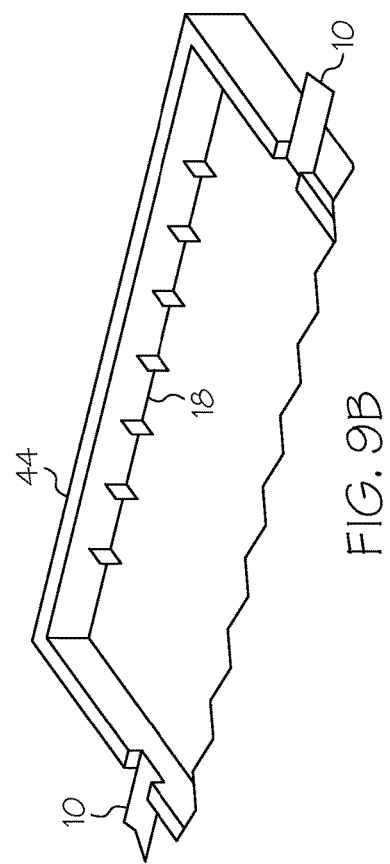
FIG. 9B is an enlarged perspective view of a fragment of the lower half of the central compartment of the articulate battery case of FIG. 9, illustrating details of the reversible fasteners.
Figure 10:
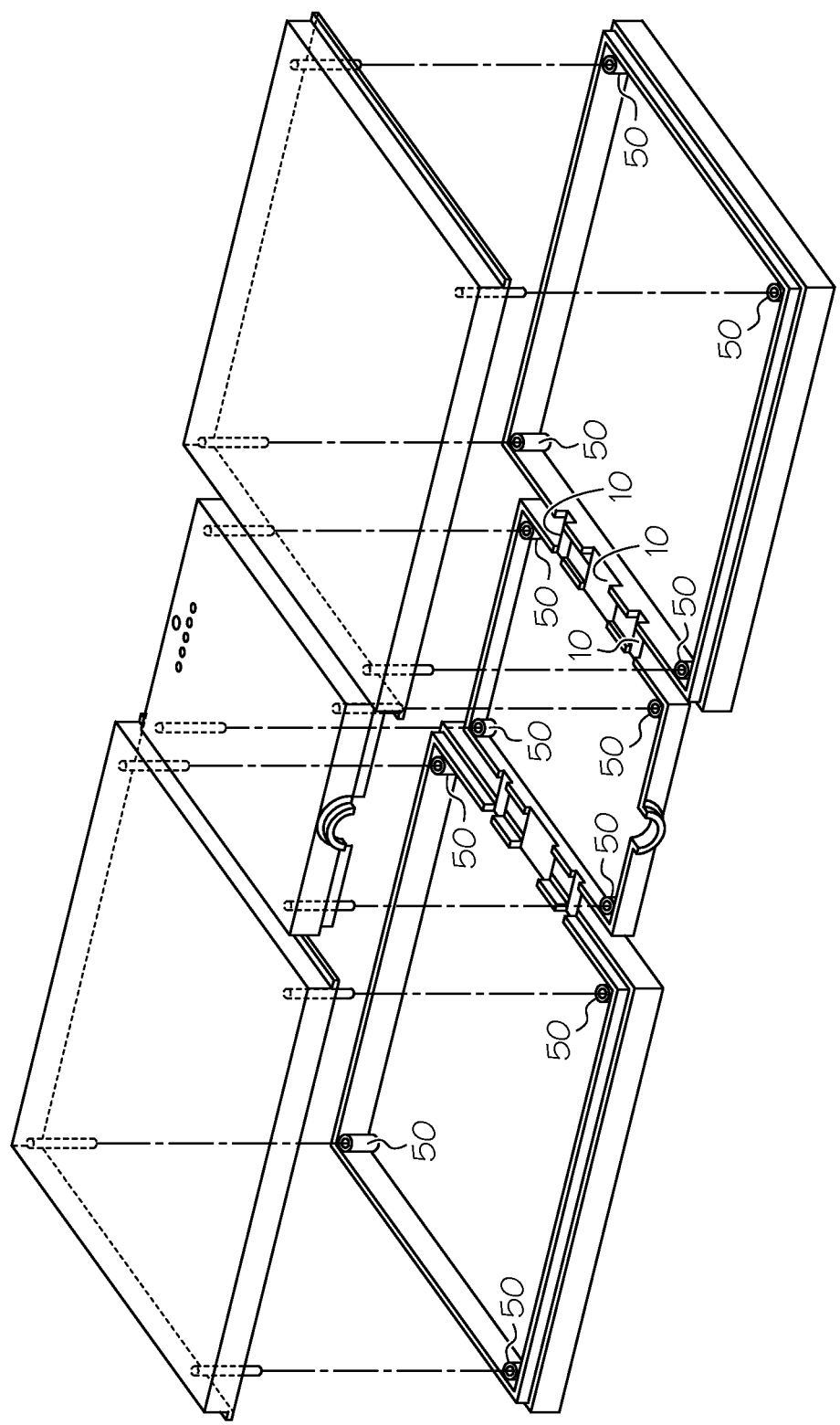
FIG. 10 is an exploded view of a further alternative embodiment of the articulate battery case of FIG. 2 (without the battery segments), illustrating captive fasteners for irreversibly fastening the two halves (upper and lower) of the articulate battery case to one another, for forming the assembled articulate battery case of FIG. 1.

Each compartment 8 has two halves, viz., an upper half 46 and a lower half 48. Once the compartments 8 are loaded with their respective electronics or battery, the two halves 16 of the compartments are fastened to one another with fasteners 18 or 50. The fasteners may be either reversible 18, as illustrated in FIGS. 9, 9A and 9B or may be irreversible 50, as illustrated in FIGS. 10, 10A, and 10B.

Figure 8:
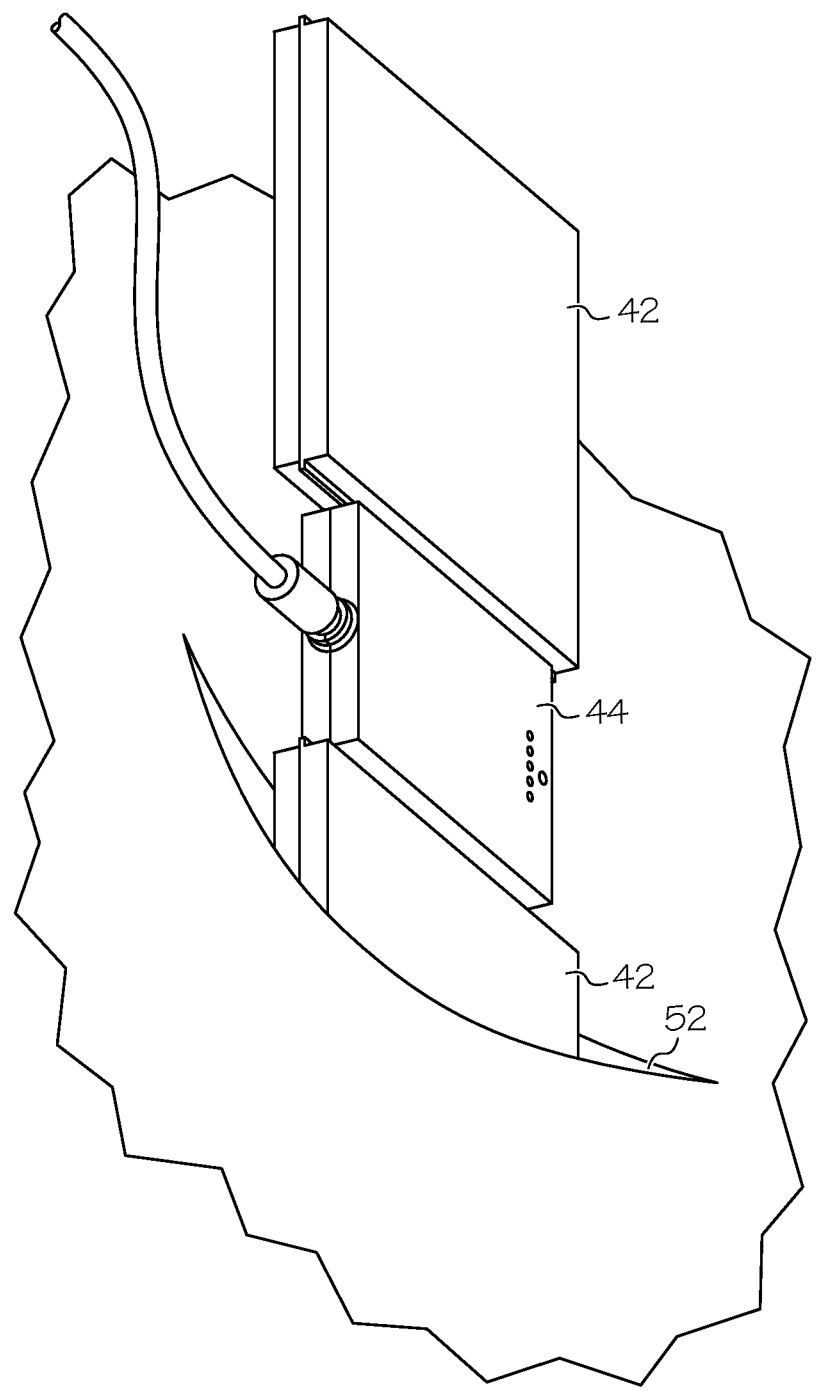
FIG. 8 is a perspective view of the linear type articulate battery case illustrated in FIG. 1 (with attached power lead), illustrating the process of inserting the battery case into a pocket.

The compartments 8 are connected to one another by living hinges 10. When the hinges 10 are in their rest positions no applied force), the three-compartment linear array 34 may assume a generally planar orientation, as illustrated in FIG. 3. When, a deforming force is applied, the three-container array flexes and departs from its planar orientation, as illustrated in FIG. 3 by phantom lines. For example, if a flexible battery pack were placed into the side pocket of a vest worn by a soldier, as illustrated in FIG. 8, the flexible battery pack holder 52 would flex, due to the deforming force applied by the pocket, and would conform therein to the side torso of the soldier.

The Hooke's constant or stiffness of the spring hinges 10 has a sufficiently small magnitude such that deformation of the spring hinges 10 does not result in any unfastening of the fasteners 18 that fasten the upper 46 and lower 48 halves of container to one another.

Each compartment 8 includes power port holes 12 through which battery power lines may be connected to the electronics. Additionally, each compartment 8 also includes a sensor port 14 hole through which battery associated sensor lines may be connected to the electronics.

The central electronics compartment 44 includes a further port hole 54 through which a power line may be connected to a battery recharger or to a device being powered by the battery pack.

The containers further include one or more stops 40 for limiting the extent by which the flexible battery pack may flex responsive to a deforming force applied to the spring hinges 10.

DEFINITIONS

Adjacent: The property of being close or near to something; not distant.

Articulate: The property of having two or more rigid parts connected by a flexible joint, whereby application of a torque on the rigid parts tends to cause the rigid parts to rotate about such flexible joint.

Battery: A device for converting chemical energy to electrical energy. The battery includes one or more electrochemical cells, each having two electrodes (cathode and anode), electrolytes for carrying charge, and an optional battery management system (BMS). Electrochemical cells are housed in a battery enclosure for containing the electrodes and electrolytes.

Battery Case: A protective housing for the main components of a battery, including the battery enclosure.

Battery Enclosure: A container for enclosing a battery, including its electrochemical cells (electrodes and electrolytes). The battery enclosure may also include an optional compartment for enclosing a battery management system (BMS), or the BMS may be separately attached to the battery enclosure.

Battery module: A combination of electrochemical cells and BMS's housed by or within a single Battery enclosure. Battery modules may be interconnected with one another to form a battery pack.

Battery ensemble: A collection of batteries or battery modules, together with a BMS and other electronics, electrically interconnected with one another to provide enhanced power output or recharge characteristics.

Battery management system (BMS): Any electronic system that manages a rechargeable battery or battery pack, for protecting the battery from operating outside its safe operating range, e.g., by monitoring its state, calculating secondary data, reporting that data, controlling its environment, authenticating it and/or balancing it.

Compartment: An enclosed space for holding something.

Flexible: The quality of a material capable of deforming elastically and returning to its original shape when the applied stress is removed.

Hinge: A bearing for connecting two rigid objects, while allowing the rigid objects to rotate relative to one another about a fixed axis of rotation centered about such bearing. Hinges may be made of flexible material.

Intervening: The property of being between two things.

Joint: The place where two parts are joined.

Non-contiguous: The property to two or more objects not touching one another.

What is claimed is:

1. An articulate battery case for encasing a battery ensemble and rendering the encased battery ensemble articulate, the battery ensemble being of a type having multiple non-contiguous battery segments flexibly interconnected to one another with one or more conductive leads, the one or more conductive leads being flexible, the articulate battery case comprising:

a plurality of rigid compartments for encasing the battery ensemble, each compartment being configured for encasing one non-contiguous battery segment; and a plurality of flexible hinges attached to said compartments for flexibly connecting adjacent compartments to one another, the plurality of flexible hinges comprising a plurality of compressible coiled springs, and the plurality of flexible hinges further comprising the one or more conductive leads, each compartment being flexibly connected to at least one adjacent compartment and being articulate therewith;

each compartment being interconnected to every other compartment, with or without one or more intervening compartment;

each compartment defining one or more ports for interconnecting the one or more conductive leads between battery segments encased in adjacent compartments, whereby encasing the battery ensemble within the articulate battery case renders the encased battery ensemble articulate.

2. An articulate battery case according to claim 1, wherein the plurality of flexible hinges are resilient.

3. An articulate battery case according to claim 1, wherein the plurality of flexible hinges comprise living hinges.

4. An articulate battery case according to claim 1, wherein the plurality of flexible hinges are attached diagonally.

5. An articulate battery case according to claim 1, wherein the plurality of flexible hinges comprise an elastic composite composition.

6. An articulate battery case according to claim 1, further comprising:
a stop attached to said compartment for limiting articulation of said compartment.

7. An articulate battery case according to claim 1, wherein the ports of adjacent compartments are aligned with one another for interconnecting the one or more conductive leads between battery segments encased in such adjacent compartments.

8. An articulate battery case according to claim 1, wherein said compartments form a linear array.

9. An articulate battery case according to claim 1, wherein said compartments form a matrix array.

10. An articulate battery case according to claim 1, wherein said compartments form a circular array.

11. An articulate battery case according to claim 1, wherein each of said compartments comprise two halves joined by reversible fasteners.

12. An articulate battery case according to claim 1, wherein each of said compartments comprise two halves joined by irreversible fasteners.

13. A method for encasing a battery ensemble, the method comprising:
encasing the battery ensemble in the articulate battery case of claim 1.

14. A method for articulating a battery ensemble, the method comprising:
encasing the battery ensemble in the articulate battery case of claim 1 ; and articulating the encased battery ensemble by at least transitioning one or more of the plurality of flexible hinges between a deformed conformation and an un-deformed conformation.

15. A method for compressing a battery ensemble, the method comprising:
encasing the battery ensemble in articulate battery case of claim 1; and
compressing the encased battery ensemble by at least applying a compressive force against one or more of the plurality of flexible hinges.

16. A method for transporting a battery ensemble, the method comprising:
encasing the battery ensemble in an articulate battery case of claim 1;
inserting the encased battery ensemble into a carrying holder;
articulating the encased battery ensemble within the carrying holder for conforming the encased battery ensemble to the carrying holder; and
transporting the carrying holder with the encased battery ensemble inserted therein.

* * * * *